United States Patent
Legerton

(10) Patent No.: US 9,256,082 B2
(45) Date of Patent: *Feb. 9, 2016

(54) LAMINATED COMPOSITE LENS

(71) Applicant: VICOH, LLC, San Diego, CA (US)

(72) Inventor: Jerome A. Legerton, Jupiter, FL (US)

(73) Assignee: VICOH, LLC, San Diego, CA (US)

(*) Notice: Subject to any disclaimer, the term of this patent is extended or adjusted under 35 U.S.C. 154(b) by 25 days.

This patent is subject to a terminal disclaimer.

(21) Appl. No.: 14/288,225

(22) Filed: May 27, 2014

(65) Prior Publication Data

US 2014/0268022 A1    Sep. 18, 2014

Related U.S. Application Data

(63) Continuation-in-part of application No. 13/801,754, filed on Mar. 13, 2013, now Pat. No. 8,770,744, which is a continuation of application No. 12/727,137, filed on Mar. 18, 2010, now Pat. No. 8,408,698.

(51) Int. Cl.
*G02C 7/04* (2006.01)

(52) U.S. Cl.
CPC *G02C 7/049* (2013.01); *G02C 7/04* (2013.01); *G02C 2202/16* (2013.01)

(58) Field of Classification Search
CPC ............ G02C 7/02; G02C 7/04; G02C 7/047; G02C 7/049; G02B 1/041; G02B 1/043
USPC ......... 351/159.01–159.38; 359/642, 741, 796
See application file for complete search history.

(56) References Cited

U.S. PATENT DOCUMENTS

| | | | |
|---|---|---|---|
| 2,237,744 A | 4/1941 | Mullen | |
| 3,482,906 A | 12/1969 | Volk | |
| 3,489,491 A | 1/1970 | Creighton | |
| 3,594,074 A * | 7/1971 | Rosen | 351/219 |
| 3,684,357 A | 8/1972 | Tsuetaki | |
| 3,944,347 A | 3/1976 | Barkdoll et al. | |
| 3,973,837 A | 8/1976 | Page | |
| 3,973,838 A | 8/1976 | Page | |
| 4,194,815 A | 3/1980 | Trombley | |
| 4,208,362 A | 6/1980 | Deichert et al. | |
| 4,943,150 A | 7/1990 | Diechert et al. | |
| 5,347,326 A | 9/1994 | Volk | |
| 5,450,145 A | 9/1995 | Valentine | |
| 5,570,142 A | 10/1996 | Lieberman | |
| 5,626,865 A | 5/1997 | Harris et al. | |

(Continued)

FOREIGN PATENT DOCUMENTS

EP     0042679 A2    12/1981
EP     0445994 A2    9/1991

OTHER PUBLICATIONS

European Patent Office, Supplementary Partial European Search Report for EP 11756946.7, Oct. 23, 2014, pp. 1-2.

*Primary Examiner* — Darryl J Collins
(74) *Attorney, Agent, or Firm* — Sheppard Mullin Richter & Hampton LLP

(57) ABSTRACT

A composite lens comprises an anterior rigid gas permeable layer, and an annulus of soft material bonded to a posterior surface of the anterior rigid gas permeable layer, wherein a central zone of the composite lens is rigid and without a soft layer, wherein a peripheral zone of the composite lens is generally rigid in its anterior aspect and soft in its posterior aspect.

15 Claims, 4 Drawing Sheets

(56) References Cited

U.S. PATENT DOCUMENTS

| | | |
|---|---|---|
| 5,788,957 A | 8/1998 | Harris |
| 5,790,235 A | 8/1998 | Kirschbaum |
| 6,491,393 B1 | 12/2002 | Appleton |
| 7,431,455 B2 | 10/2008 | Chernyak |
| 2002/0021409 A1 | 2/2002 | Marmo |
| 2002/0093623 A1 | 7/2002 | Duppstadt |
| 2005/0018130 A1 | 1/2005 | Dahi et al. |
| 2005/0203619 A1 | 9/2005 | Altmann |
| 2005/0280777 A1 | 12/2005 | Dai |
| 2006/0023162 A1 | 2/2006 | Azar et al. |
| 2007/0082563 A1 | 4/2007 | Legerton |
| 2007/0091259 A1 | 4/2007 | Svochak |
| 2007/0291224 A1 | 12/2007 | Lai |
| 2008/0007694 A1 | 1/2008 | Wei et al. |
| 2008/0013043 A1 | 1/2008 | Ye |
| 2008/0100612 A1 | 5/2008 | Dastmalchi et al. |
| 2008/0212020 A1 | 9/2008 | Legerton |

\* cited by examiner

LAMINATED COMPOSITE LENS

CROSS-REFERENCE TO RELATED APPLICATIONS

This application is a continuation-in-part of U.S. patent application Ser. No. 13/801,754 filed Mar. 13, 2013, which is a continuation of U.S. Pat. No. 8,408,698 filed Mar. 18, 2010, the contents of which are incorporated herein by reference in their entireties.

FIELD OF THE INVENTION

The present invention relates generally to laminated composite lenses, and more particularly to laminated composite lenses having an annulus of soft material bonded to the posterior surface of an anterior rigid gas permeable layer.

BACKGROUND OF THE INVENTION

Refractive correction is achieved through use of spectacle lenses, contact lenses, corneal refractive surgery and intraocular lens implantation. Contact lenses have evolved from non-gas-permeable rigid lenses which made contact with the sclera and vaulted the cornea, to corneal contact lenses made of gas permeable products, and then to corneal-scleral contact lenses made of hydrogel materials. Hybrid lenses were created to provide the improved optics of rigid lenses with the comfort of soft lenses. Conventional hybrid lenses were configured to have a central rigid zone joined at a radial junction to a peripheral hydrogel zone.

Hybrid lenses of this configuration enjoy commercial success with limitations due to the separation of the two materials at their radial junction, lens flexure and tear stagnation due to a circumferential sealing of the lens against the underlying eye. Advanced manufacturing processes and ultra high gas permeable materials have stimulated a resurgence of fully rigid scleral lens designs. Problems with such designs include time consuming lens fitting, lens flexure, scleral impingement, tear stagnation, persistent mid-peripheral bubbles and difficulty in lens removal due to lens adherence.

US Patent Publication No. 2007/0291224 to Shui Lai discloses a lens having a contiguous soft back surface which is bonded to a contiguous rigid front surface. Such a composite lens presents difficulty due to the loss of integrity of the optics due to irregularities caused by the bonding of the soft material to the rigid material in the optic zone of the lens. Further, the expansion of the soft material upon hydration of as little as 1% is known to create stresses at the surface which stimulate optical distortion and potential separation. Additionally, the soft material is known to inter-penetrate the rigid material with resultant random changes in the index of refraction.

Reports of ideal lens-eye relationships with rigid scleral contact lenses detail the importance of having a clearance of between 10 and 100 microns or more between the posterior lens surface and the anterior corneal surface. Hence, there is no clear need for hydrogel material in the corneal portion of a laminated composite hybrid lens.

SUMMARY OF THE INVENTION

The present invention addresses the need for a composite hybrid lens having the advantages of a scleral contact lens with the added advantages of soft material in contact with the bulbar conjunctiva covering the sclera. Such a lens requires tear exchange, freedom from scleral impingement, methods of managing flexure and air bubbles resulting from excessive clearance between the lens and the underlying eye, and a release of the surface attraction which causes difficulty in lens removal due to adherence.

Various embodiments of the present invention are directed to a composite lens, comprising an anterior rigid gas permeable layer, and an annulus of soft material bonded to a posterior surface of the anterior rigid gas permeable layer. A central zone of the composite lens is rigid and without a soft layer, while a peripheral zone of the composite lens is generally rigid in its anterior aspect and soft in its posterior aspect. In one implementation, the central zone of the composite lens is 7 mm to 16 mm in diameter. In another implementation, the central zone of the composite lens is 10 mm to 13 mm in diameter. The annulus of soft material comprises a non-segmented annulus or a segmented annulus. The central zone may be circular or non-circular. In one implementation, the central zone may be oval or elliptical. In another implementation, the central zone may have an irregular shape.

For segmented embodiments, the segmentation of the annulus serves as a relief for undesired expansion of the soft material on hydration, and prevents buckling or surface distortion due to expansion. The segmented annulus comprises a plurality of segments separated by spaces between segments, wherein the spaces provide for exchange of fluids from a post lens tear reservoir, which forms under the anterior rigid gas permeable layer. In addition, the spaces relieve lens-eye surface attraction, thereby facilitating lens removal. In some embodiment, (i) each segment comprises a sector of a peripheral portion of the lens ranging from 15 degrees to 30 degrees, (ii) a width of each space is 10 microns to 1000 microns, and (iii) a radial width of the soft annulus 2.5 mm to 5 mm. The thickness of the soft annulus may vary to accommodate ocular contour. In one embodiment, the segments are uniform in shape. In another embodiment, the segments are irregular and non-uniform, and the spaces between the segments are irregular and vary in width from the central zone to the most peripheral portion of the soft annulus.

Embodiments of the invention featuring a variation in the thickness of the soft annulus have the effect of reducing flexure in the rigid portion that would occur because of differences in the ocular contour. Another effect involves achieving rotational stability. Specifically, the conformance to ocular contour by the non-uniform thickness of the annulus produces rotational stability. The unequal thickness of the soft annulus can be orthogonal (90 degrees apart) or non-orthogonal (irregular) where the deepest and the shallowest regions are not 90 degrees apart.

Another embodiment of the invention is directed toward a method for manufacturing a composite lens, comprising: (i) forming a rigid button; (ii) diamond turning a peripheral radius on a posterior portion of the rigid button while sparing a central portion; (iii) mounting the button in a cup; (iv) treating an exterior surface of the rigid button; and (v) casting a selected soft lens material in the cup such that the soft lens material is bonded to a curved posterior surface of the rigid lens material. In some embodiments, the rigid portion may be molded into the desired shape. The step of forming a rigid button may be performed by conventional casting in a cup or from sectioning of a rod of polymerized material. The method may further entail diamond turning a posterior surface of the composite lens to produce a desired posterior geometry. In addition, the method may comprise removing portions of the soft lens material to form a soft peripheral annulus having a plurality of segments. The portions may be removed by diamond turning, milling, water jet cutting or laser etching.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION

In the following paragraphs, the present invention will be described in detail by way of example with reference to the attached drawings. Throughout this description, the preferred embodiment and examples shown should be considered as exemplars, rather than as limitations on the present invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

Figure 1:
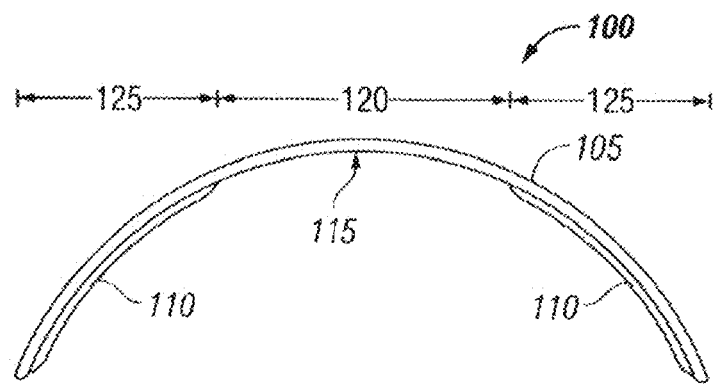
FIG. 1 is a cross-sectional view of a laminated composite lens, in accordance with one embodiment of the present invention.
Figure 2:
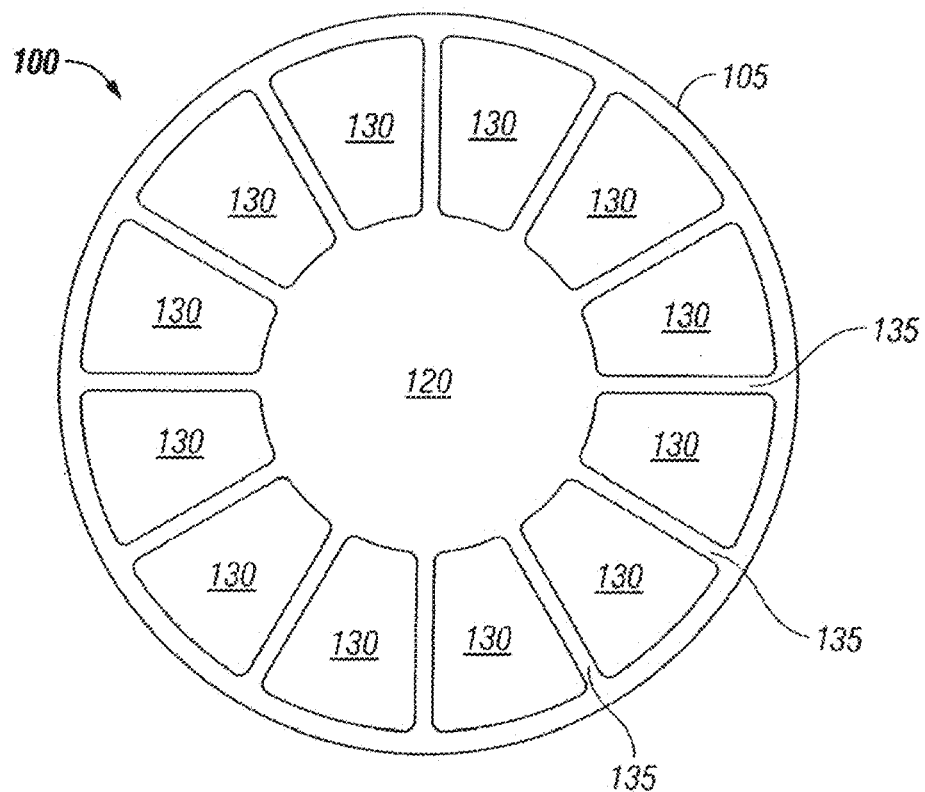
FIG. 2 is a side view of the laminated composite lens of FIG. 1, in accordance with one embodiment of the invention.

FIGS. 1 and 2 illustrate cross-sectional and side views, respectively, of a laminated composite lens 100 in accordance with the principles of the invention. Specifically, the composite lens 100 comprises an anterior rigid gas permeable layer 105 and an annulus 110 of soft material bonded to a posterior surface 115 of the anterior rigid gas permeable layer 105. As such, a central zone 120 of the composite lens 100 is rigid and without a soft layer, while a peripheral zone 125 of the composite lens 100 is generally rigid in its anterior aspect and soft in its posterior aspect. The central zone 120 of the composite lens 100 is about 3 mm to 20 mm in diameter, preferably about 7 mm to 16 mm in diameter, more preferably about 10 mm to 13 mm in diameter. During use, the central zone 120 can approximate the horizontal diameter of the human or animal cornea upon which the composite lens 100 is applied.

According to various embodiments of the invention, the soft posterior peripheral annulus 110 may be a complete, unbroken annulus or it may be a segmented annulus. In the illustrated embodiment, the annulus 110 is segmented and comprises 12 segments 130 substantially equivalent in shape and size. Any number of segments may be employed without departing from the scope of the invention. This segmentation serves as a relief for undesired expansion of the soft material on hydration, and prevents buckling or surface distortion due to expansion. The spaces 135 between segments 130 also provide for exchange of fluids from the post lens tear reservoir, which forms between the wearer's cornea and the central zone 120 of the lens 100. Moreover, these spaces relieve the lens eye surface attraction which otherwise is a major cause of difficulty in lens removal.

With further reference to FIGS. 1 and 2, each section 130 of the segmented annulus 110 of soft material comprises a wedge or sector of the peripheral portion 125 of the composite lens 100. As illustrated, these wedges or sectors range from 1 degree to 180 degrees, preferably from 5 degrees to 90 degrees, more preferably from 15 degrees to 30 degrees. The space 135 between each sector ranges from approximately 1 micron to 25000 microns, preferably from approximately 5 microns to 12500 microns, more preferably from approximately 10 microns to 1000 microns.

The thickness of the posterior peripheral annulus 110 is between about 2 microns and 1000 microns, preferably between about 10 microns and 500 microns, more preferably between about 40 microns and 200 microns. In addition, the thickness of the annulus 110 may not be uniform over the width of the annulus 110 and may vary to accommodate ocular contour. A variation in the thickness of the soft annulus 110 has the effect of reducing flexure in the central zone 120 that would occur because of differences in the ocular contour. In addition, the varying thickness of the annulus 110 helps to achieve rotational stability. In particular, the conformance to ocular contour by the non-uniform thickness of the annulus 110 produces rotational stability. In some embodiments, the unequal thickness of the soft annulus 110 is substantially orthogonal (i.e., 90° apart). In other embodiments, the unequal thickness of the soft annulus 110 is substantially non-orthogonal (i.e., irregular) wherein the deepest and the shallowest regions are not 90° apart. In some configurations, the relative elevation of the soft peripheral annulus 110 may also be used to compensate for corneal and/or scleral elevation differences. The central zone 120 of the composite lens 100 (containing only the gas permeable layer 105) may be formed as needed to meet a particular prescription. As such, the thickness of the gas permeable layer 105 may be variable across the optic zone.

Some embodiments of the invention feature composite lenses having a soft posterior annulus 110 bonded to a rigid gas permeable anterior layer 105 having a total diameter of approximately 7 millimeters to 35 millimeters, preferably approximately 10 millimeters to 22 millimeters, more preferably approximately 13 millimeters to 19 millimeters. The radial width of the soft annulus 110 is about 0.25 millimeter to 10 millimeters, preferably about 0.5 millimeters to 6 millimeters, more preferably about 1 mm to 5 millimeters. The soft annulus 110 is configured to have a width that is substantially equivalent to the portion of the composite lens 100 which is anterior to the sclera of the wearer's eye. In some embodiments, the soft annulus 110 is also anterior to a portion of the cornea-sclera junction and the cornea. Further embodiments of the invention feature a lens having a central rigid portion and a soft peripheral portion joined at a junction, but also has a laminated composite feature with a soft annulus posterior to the rigid portion. In such embodiments, the soft annulus is adapted to lift the rigid portion above the cornea. This is a function which is not possible with conventional hybrid lenses.

Figure 3A:
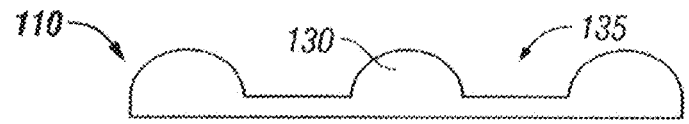
FIGS. 3A-3F illustrate cross-sectional views of various segment configurations of the soft posterior peripheral annulus of FIG. 1, in accordance with the principles of the invention.
Figure 3B:
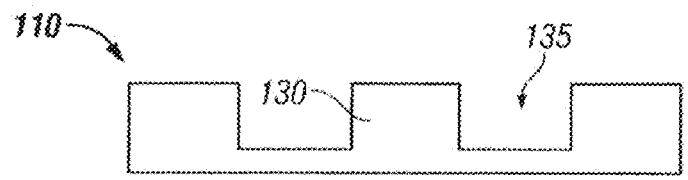
Figure 3C:
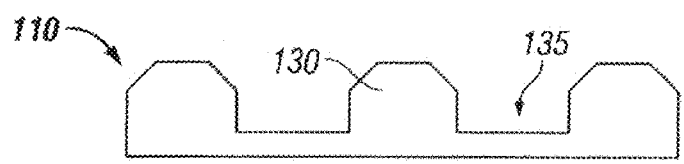
Figure 3D:
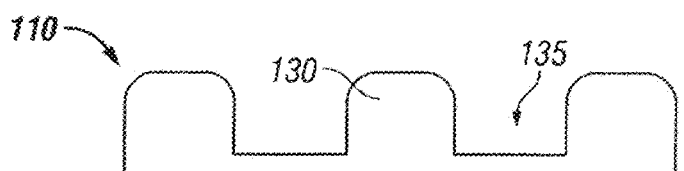
Figure 3E:
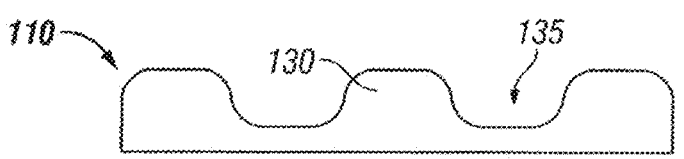
Figure 3F:
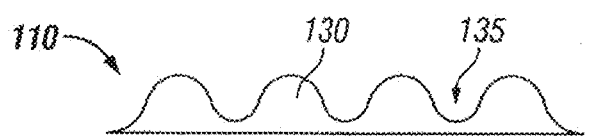

FIGS. 3A-3F illustrate cross-sectional views of various segment configurations of the soft posterior peripheral annulus 110 of FIG. 1, in accordance with the principles of the invention. Specifically, FIG. 3A depicts soft annulus 110 having substantially half-circular segments 130 separated by spaces 135. In addition, FIG. 3B, illustrates a rectilinear configuration of soft annulus 110 with rectangular segments 130 and spaces 135, while FIG. 2C illustrates half-octagonal segments 130 separated by spaces 135. In FIG. 3D, the segments 130 of soft annulus 110 are rounded at the corners and the spaces 135 include sharp corners, whereas in FIG. 3E, both the segments 130 and spaces 135 are rounded. Finally, in FIG. 3F, the alternating segments 130 and spaces 135 of the soft annulus 110 form a substantially sinusoidal pattern. As would be appreciated by those of ordinary skill in the art, many other soft posterior peripheral annulus 110 configurations are possible without departing from the scope of the invention.

Methods of Manufacture

Figure 4:
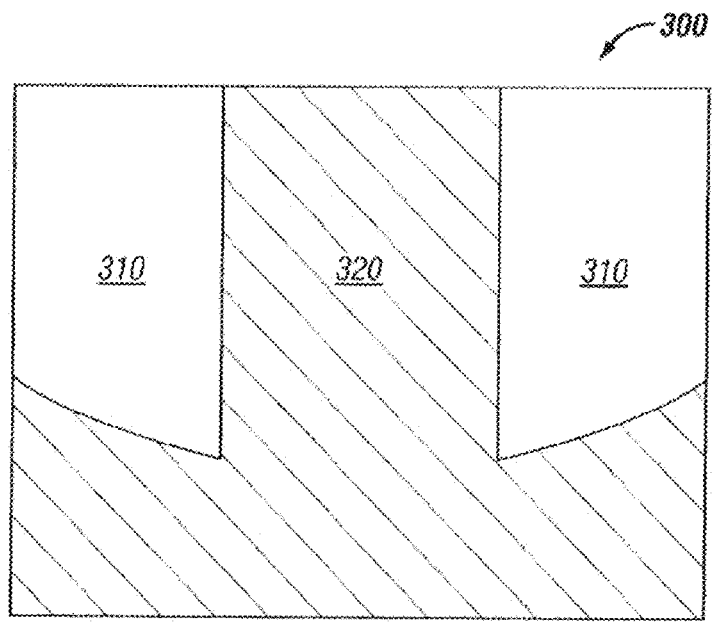
FIG. 4 is a cross-sectional view of a pre-formed button for making a laminated composite lens, in accordance with one embodiment of the invention.

Referring to FIG. 4, the composite lenses described herein can be molded or diamond turned from a pre-formed button 300 including soft lens material 310 and rigid lens material 320. One exemplary method involves (i) forming a rigid button by conventional casting in a cup or from sectioning of a rod of polymerized material, (ii) diamond turning a peripheral radius on the posterior portion of the button while sparing the central portion, (iii) mounting the button in a cup, (iv) treating the surface of the rigid button, and (v) casting the desired soft lens material 310 in the cup such that the soft lens material 310 is bonded to the curved posterior surface of the rigid lens material 320 in the periphery of the button 300.

Since the central rigid lens material 320 will later be removed by diamond turning, there is no need to have the soft lens material 310 bonded to the central rigid material 320 at a radial junction.

Referring to FIGS. 1-4, the posterior surface 115 of the composite lens 100 is diamond turned to produce a desired posterior geometry with the medial aspect of the soft peripheral annulus 110 transitioning anterior-ward to a pre-selected chord diameter where all the soft lens material 310 is eliminated. In this manner, the peripheral aspect of the soft peripheral annulus transitions anterior-ward to a preselected chord diameter where the edge of the composite lens 100 is formed and all the soft lens material 310 is eliminated.

According to some embodiments of the invention, the soft lens material 310 is also removed to form segments 130 of the peripheral annulus 110, as depicted in FIG. 2. In other embodiments, a complete, unbroken (i.e., non-segmented) annulus is employed without segmentation. In segmented annulus embodiments, the material may be removed by diamond turning, milling, water jet cutting or laser etching.

The composite lens 100 is then blocked and the front surface is diamond turned in the conventional manner.

One skilled in the art would understand that the soft material could be molded during its bonding process after the posterior surface of the rigid layer was lathed to a final specification. Such molding could impart the segmented sector configuration to the soft peripheral annulus.

Figure 5:
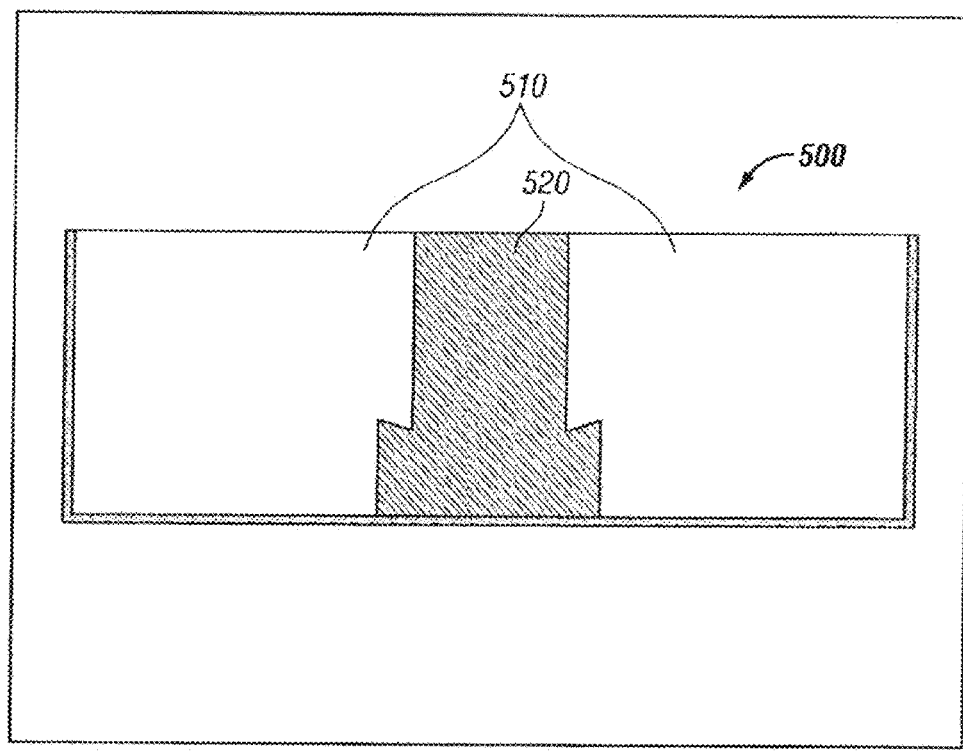
FIG. 5 is a cross-sectional view of a button for fabricating a hybrid lens with an annulus of soft 510 on the ocular surface of rigid material, in accordance with one embodiment of the invention.

Referring to FIG. 5, a button 500 is depicted for fabricating a hybrid lens with an annulus of soft material 510 on the ocular surface of rigid material 520. Unlike conventional hybrid buttons, the button 500 of FIG. 5 does not require a feature on the side of the button 500 that would be within the radial junction, and also does not require a curvilinear junction or an angled junction. Instead, the junction of FIG. 5 can be straight since the soft material 510 covering the back of the lens provides the strength and increased surface area for the soft/rigid junction.

Figure 6:
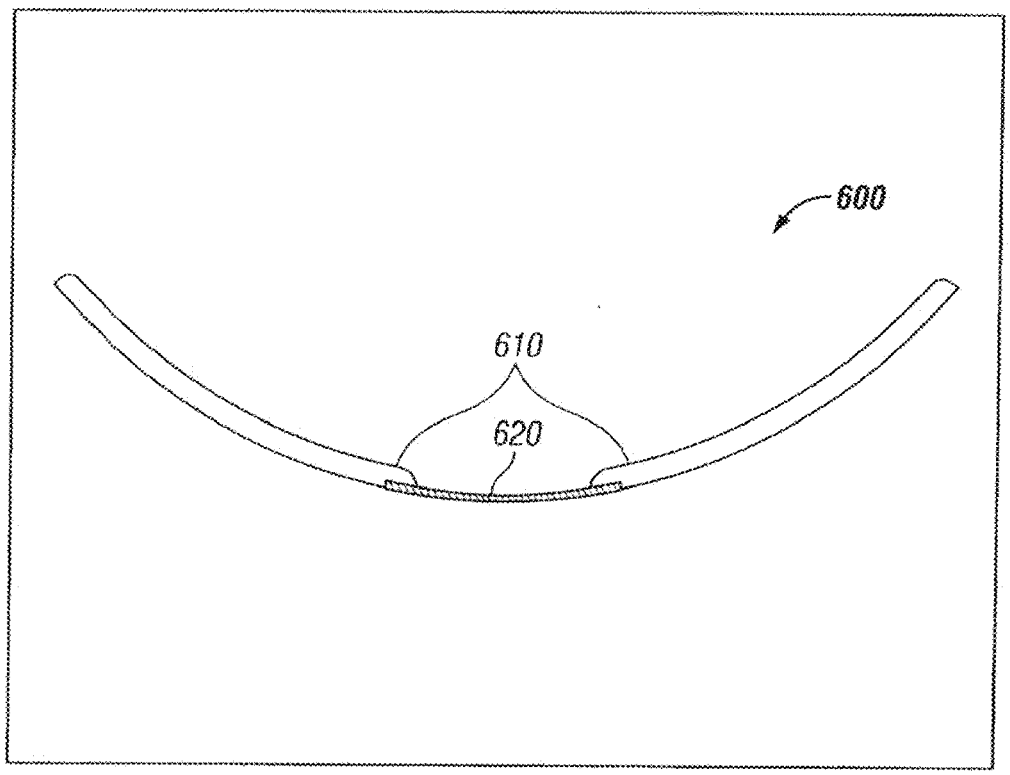
FIG. 6 is a cross-sectional view of a finished lens fabricated from the button of FIG. 5, in accordance with one embodiment of the invention.

FIG. 6 illustrates a finished lens 600 fabricated from the button 500 of FIG. 5. In particular, the lens includes soft annulus portion 610 and rigid portion 620, wherein some of the rigid material 620 is removed between the two soft extensions 610. This space allows for a post lens tear layer, a feature that prevents the rigid material 620 from contacting and adhering to the cornea. In the illustrated embodiment, the soft annulus 610 is provided for the peripheral portion of the back of the rigid portion 620 of the lens 600.

One skilled in the art will appreciate that the present invention can be practiced by other than the various embodiments and preferred embodiments, which are presented in this description for purposes of illustration and not of limitation, and the present invention is limited only by the claims that follow. It is noted that equivalents for the particular embodiments discussed in this description may practice the invention as well.

While various embodiments of the present invention have been described above, it should be understood that they have been presented by way of example only, and not of limitation. Likewise, the various diagrams may depict an example architectural or other configuration for the invention, which is done to aid in understanding the features and functionality that may be included in the invention. The invention is not restricted to the illustrated example architectures or configurations, but the desired features may be implemented using a variety of alternative architectures and configurations. Indeed, it will be apparent to one of skill in the art how alternative embodiments may be implemented to achieve the desired features of the present invention. Also, a multitude of different constituent part names other than those depicted herein may be applied to the various parts of the devices. Additionally, with regard to operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent.

The invention claimed is:

1. A composite lens, comprising:
   a central zone and a peripheral zone;
   an anterior rigid layer; and
   an annulus of soft material bonded to a posterior surface of the anterior rigid layer, the annulus having regions that vary in thickness;
   wherein the regions that vary in thickness are substantially orthogonal such that a deepest region and a shallowest regions are substantially 90° apart.

2. The composite lens of claim 1, wherein providing an annulus having regions that vary in thickness reduces flexure in the rigid layer.

3. The composite lens of claim 1, wherein providing an annulus having regions that vary in thickness provides rotational stability due to conformance to ocular contour by the non-uniform thickness of the annulus.

4. The composite lens of claim 1, wherein the thickness of the annulus varies to accommodate scleral contour.

5. The composite lens of claim 1, wherein the thickness of the annulus varies to accommodate peripheral corneal contour.

6. The composite lens of claim 1, wherein a region of the annulus that varies in thickness is located in the scleral region.

7. The composite lens of claim 1, wherein a region of the annulus that varies in thickness is located in the corneoscleral region.

8. The composite lens of claim 1, wherein a region of the annulus that varies in thickness is located in the corneal region.

9. The composite lens of claim 1, wherein a thickness of the soft annulus varies to accommodate ocular contour.

10. The composite lens of claim 1, wherein the central zone is rigid and without a posterior soft layer.

11. The composite lens of claim 1, wherein a peripheral aspect of the central zone is rigid in its anterior aspect and soft in its posterior aspect.

12. The composite lens of claim 1, wherein the peripheral zone is soft and without an anterior rigid layer.

13. The composite lens of claim 1, wherein the central zone of the composite lens is 7 mm to 16 mm in diameter.

14. The composite lens of claim 1, wherein the central zone of the composite lens is 9 mm to 13 mm in diameter.

15. The composite lens of claim 1, wherein a radial width of the soft annulus is 250 microns to 5 mm.

\* \* \* \* \*